H. W. PLEISTER.
CABLE CLAMP.
APPLICATION FILED FEB. 25, 1919.
1,328,543.
Patented Jan. 20, 1920.
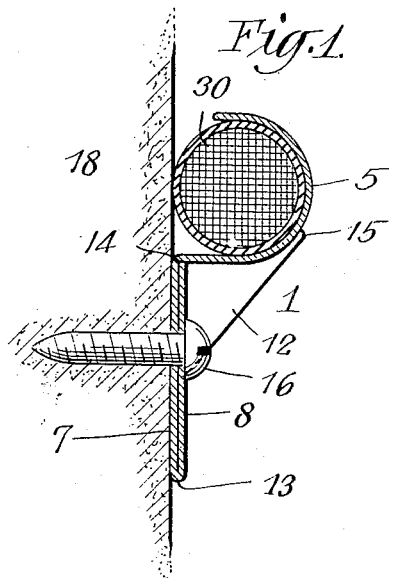
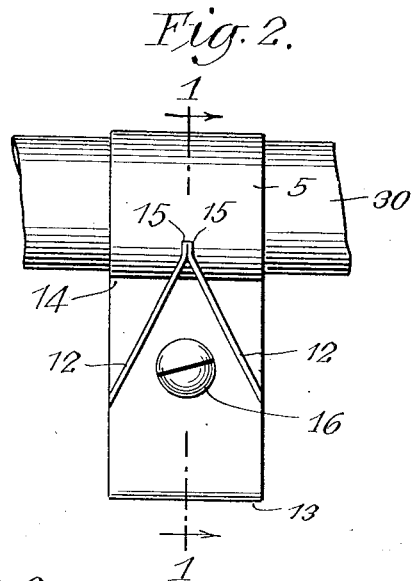
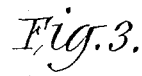
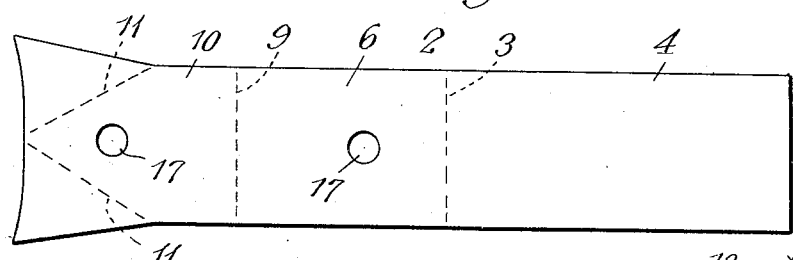
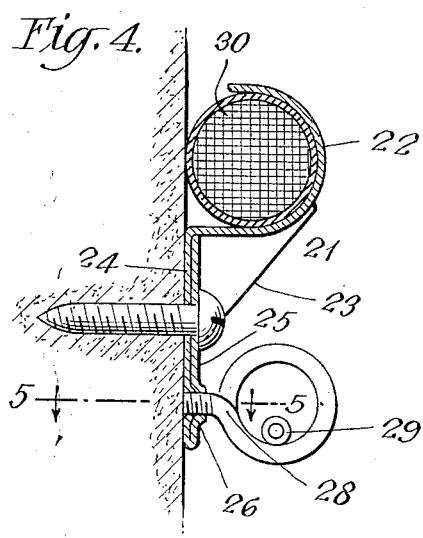
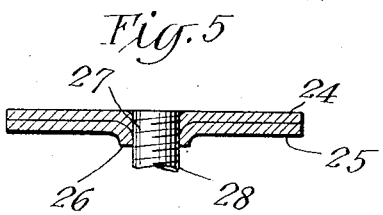
INVENTOR
Henry W. Pleister
BY
Alan M Johnson
ATTORNEY

UNITED STATES PATENT OFFICE.

HENRY W. PLEISTER, OF WESTFIELD, NEW JERSEY, ASSIGNOR TO HENRY B. NEWHALL, JR., EXECUTOR OF HENRY B. NEWHALL, DECEASED.

CABLE-CLAMP.

1,328,543.      Specification of Letters Patent.      Patented Jan. 20, 1920.

Application filed February 25, 1919. Serial No. 279,133.

*To all whom it may concern:*

Be it known that I, HENRY W. PLEISTER, a citizen of the United States, residing at Westfield, in the county of Union and State of New Jersey, have invented certain new and useful Improvements in Cable-Clamps, of which the following is a specification.

My invention relates to cable clamps which are used particularly to support cables along the face of walls, fences or other suitable supports, and which while securely holding the cable do not injure or mar it.

My invention further relates to such a cable clamp which can be manufactured at minimum cost, out of comparatively light weight material, yet one which will meet, with a wide margin of safety, all strains and stresses which may be thrown upon it under an abnormal load. Preferably, though not necessarily, I make my cable clamp out of a single integral piece of sheet metal of minimum thickness to reduce the cost of manufacture and the amount of metal used.

My invention further relates to forming a strong and rigid cable clamp by bending a portion of the metal so as to form one or more shelves or brackets of maximum strength to relieve the shearing and bending strains thrown on the clamp at its weakest point, which is at the meeting surface of the hook and base portions.

My invention further relates to the combination of a cable clamp with a bridle ring which may be used in locations where it may be desirable to support a wire in addition to the cable.

My invention further relates to certain details of construction, which will be more fully hereinafter described and pointed out in the claims.

Of the figures:—

Figure 1 is a vertical section through my cable clamp and a cable, substantially on the line 1—1 of Fig. 2 looking in the direction of the arrows;

Fig. 2 is a front elevation;

Fig. 3 is a plan view of a blank from which I preferably form my cable clamp;

Fig. 4 is a vertical section showing a modification in which a bridle ring is used;

Fig. 5 is a horizontal section substantially on the line 5—5 of Fig. 4 looking in the direction of the arrows;

Fig. 6 is a fragmentary vertical sectional view of a modification.

It has been the custom of some electrical engineers to use straps encircling the cable with angular ears at each end of the strap provided with holes for the reception of a securing screw. This form is what is known as a two hole clamp. In using such a clamp in running a cable along a corner formed by a wall and a ceiling or in a corner formed by two walls and a ceiling it is necessary to support the cable at an appreciable distance from the ceiling on account of the angular ears and holes; the distance from the ceiling must be sufficient to not only receive the angular ears but sufficient for the mechanic to work to position the clamp. If it were attempted to change such a two hole cable clamp to a one hole cable clamp by omitting one of these ears an excessive bending and shearing strain would be thrown upon the other ear which could not resist such strains. This would result in the cable falling. To make a one hole cable clamp of sufficient strength to carry such cables it would be necessary to make it of relatively great thickness and weight of metal which would greatly increase the cost and make such a one hole cable clamp more expensive to manufacture than a two hole cable clamp of corresponding strength.

By my invention I employ a one hole clamp which can be set in close to any corner and close to the ceiling at any inter-section of walls and ceiling. I form a one hole clamp of the same, or greater strength, than a two hole clamp previously described and at less cost. I reinforce the weakest portion of the clamp by one or more shelves or brackets formed beneath the hook portion of the clamp and which extend well out on the hook portion to buttress it and hold it firm against any and all bending and shearing strains which may be thrown upon the clamp by a normal or abnormal load.

In my invention I preferably form my cable clamp 1 from a sheet metal blank 2. This blank is bent in any suitable manner along the line 3 so that the portion 4 of the blank becomes the hook portion 5 of the complete cable clamp. In bending the portion 4, the portion 6 of the blank is bent at right angles to form the base portion 7 of the complete clamp. In the preferred construction, where the bracket or reinforcing member 8 is formed integral with the other portions of the clamp, I bend the blank 2 along the line 9 so that the portion 10 of the blank is bent back on the portion 6 to form the bracket or reinforcing member 8. The portion 10 of the blank is also bent along the lines 11—11 to form the two brackets or shelves 12—12. My invention may be used simply with one bracket or shelf 12; but for greater strength and rigidity I preferably form two such shelves of brackets so that they form substantially an inverted V, see Fig. 2. The legs of the V extend well down toward the end 13 of the clamp and away from the meeting surface 14 of the hook portion 5 and the base 7 so as to permit the maximum length of metal in the bracket member 8 to be bent over at right angles to said member to form the shelves or brackets 12—12. This will also permit the ends 15—15 of the shelves or brackets to extend well out on the curve portion of the hook member 5 to better receive and transmit the bending and shearing strains directly to the screw 16 and relieve the meeting surface 14 of most of these strains and stresses. The more material that is bent over to form the brackets or shelves 12—12 the greater will be the outer reach of the brackets or shelves, and the farther they reach out on the hook portion 5 the greater will be the strength of the complete cable clamp.

When the blank is formed, or subsequently, it may be provided with registering holes 17—17 for the reception of the wood screw or other securing member 16 which is secured to the support 18.

Instead of having the bracket member 8 formed integral with the base member 7, which is the preferred construction, I may form my clamp with a base 19, Fig. 6, having a separate bracket member 20.

My cable clamp will be used preferably for attaching a single cable 30 to a support. There are locations, however, in which it is desirable to support a telephone wire by the same cable clamp. When the cable clamp has also to perform this function it is necessary to provide it with another hole for the reception of a bridle ring. As one of the main objects of my invention is to reduce the cost of manufacture by permitting the cable clamp to be formed of sheet metal of relatively thin stock it may be desirable to increase locally the thickness of the cable clamp. This may be done by providing a boss or enlargement to permit a greater thickness of metal to be screw threaded for the reception of the bridle ring.

I have shown in Fig. 4 a modification in which the cable clamp 21 is provided with a hook portion 22, shelves or brackets 23, base portion 24 and the bracket member 25, all as previously described with the exception that the lower portion of the cable clamp 21 has been provided locally with the boss 26, which extends out slightly from the surface of the bracket member 25 so as to form, at this point, an increased thickness of metal, which is screw threaded with the female screw threads 27 to coöperate with the male threads upon this bridle ring 28 which is used to support the telephone wire 29.

Having thus described this invention in connection with illustrative embodiments thereof, to the details of which I do not desire to be limited, what is claimed as new and what is desired to secure by Letters Patent is set forth in the appended claims.

What I claim is:—

1. The combination in a cable clamp of a one piece cable clamp formed from sheet metal having a hook portion, a base, a bracket member bent back on the base and two shelves or brackets bent up from the bracket member having their free ends touching each other and extending well out on the curved portion of the hook member, thereby forming substantially an inverted V.

2. The combination in a cable clamp of a one piece cable clamp formed from sheet metal having a hook portion, a base, a bracket member bent back on the base and one or more brackets or shelves bent at an angle to the bracket member and contacting with the hook portion, the base and bracket member being provided with a thickened portion for the reception of a bridle ring.

HENRY W. PLEISTER.

Witnesses:
 MARY R. RYAN,
 ANNA M. WILLIAMS.